Jan. 19, 1971  D. S. CHISHOLM ET AL  3,557,265
METHOD OF EXTRUDING LAMINATES
Filed Dec. 29, 1967

INVENTORS.
Douglas S. Chisholm
BY Walter J. Schrenk

AGENT

3,557,265
METHOD OF EXTRUDING LAMINATES
Douglas Chisholm, Midland, and Walter J. Schrenk, Bay City, Mich., assignors to The Dow Chemical Company, Midland, Mich., a corporation of Delaware
Continuation-in-part of application Ser. No. 432,258, Feb. 12, 1965. This application Dec. 29, 1967, Ser. No. 694,470
Int. Cl. B29f *3/00;* B29h *7/20;* B32b *31/30*
U.S. Cl. 264—47                    13 Claims

ABSTRACT OF THE DISCLOSURE

A method is described whereby plastic film or sheet having a plurality of layers is formed by deforming a flowing stream having layers of diverse thermoplastic material wherein the cross-sectional configuration of the plurality of flowing streams is altered by reducing the dimension of the stream in a direction generally perpendicular to the interfaces between the individual streams and by increasing the dimension of the stream in a direction generally parallel to the said interface to provide a sheet or film having a laminar structure. Optionally, alternating foamed and unfoamed layers may be obtained.

---

This application is a continuation-in-part of our copending applications Ser. Nos. 402,118, filed Oct. 7, 1964, now abandoned, and 432,258, filed Feb. 12, 1965, now abandoned.

This invention relates to a method for the preparation of laminates. It more particularly relates to an improved method for the preparation of multilayer laminates from thermoplastic materials.

It is well known in the art to prepare laminates of various heat formable materials wherein the properties of the various components of the laminate contribute to the final properties of the laminated structure. Many of these laminates are prepared by forming the individual components and subsequently combining them by means of heat, pressure, adhesives and the like. Certain composite articles are formed by the co-extrusion or simultaneous extrusion of two or more diverse materials. However, such techniques known to the art are not well suited for the preparation of multilayer laminates wherein more than two or three layers of material are combined in the final product. In certain co-extrusion operations, particularly where thin sheets or laminated articles are prepared, there is much difficulty in obtaining a uniform composition of the product. That is, the thickness of the various lamina making up the composite article may vary, thus imparting undesired and non-uniform characteristics to the resultant product. Furthermore, the number of layers of material in conventional operations is generally limited severely by known die configurations or requires laborious layup or combination. Many foam plastic or synthetic thermoplastic resinous materials are known and commercially used for a variety of applications. Many of these foamed materials lack high physical strength at relatively low bulk density. Frequently they are employed in sandwich structures as cores and oftentimes as structural elements. Frequently, many of the economically desirable foam plastic materials are inadequate for structural applications where they are subjected to vibration, impact and the like. Many of such foam plastic sheets must be affixed by means of adhesives or like techniques wherein the load is distributed over a relatively broad area. Often, when foam panels are employed as structural elements, horizontal shear deformation is a serious cause of failure. This phenomenon appears to be associated with cell size of the foam and the thickness of the panel. Such foams oftentimes readily puncture and frequently split and crumble. When subjected to undue stress, the foams frequently crack and the crack propagates rapidly to result in failure of the element.

It is an object of this invention to provide a plastic foam structure having improved resistance to horizontal shear failure, improved puncture resistance, improved resistance to splitting, crumbling and improved impact resistance and toughness.

It is an object of this invention to provide an improved method for the production of multilayer laminates.

A further object of this invention is to provide a method for the extrusion of a laminate structure having a relatively large number of lamina.

A further object of this invention is to provide a method for the extrusion of laminated structures wherein the various lamina are of generally regular thickness.

A further object of the invention is to provide a method for the production of thin thermoplastic resinous sheet and film comprising a plurality of lamina.

It is a further object of this invention to provide an improved laminate comprising a plurality of lamina having the lamina parallel to the major surfaces of the sheet.

These benefits and other advantages in accordance with the method of the invention are readily accomplished by providing a plurality of adjacent streams of thermoplastic material in contiguous relationship to each other, altering the cross-sectional configuration of the plurality of streams by reducing the dimension of the stream perpendicular to interfaces between the individual streams and increasing the dimension in a direction transverse to the direction of flow and generally parallel to the interfaces of the streams.

In one particularly advantageous form of the invention, composite foam articles are provided. Such articles are readily fabricated in accordance with the method of the present invention which comprises extruding a plurality of heat plastified streams of a non-expandable thremoplastic resinous material, extruding a plurality of heat plastified streams of an expandable thermoplastic resinous material in generally parallel alternating relationship within a configuration so as to form a main stream comprising a plurality of generally parallel layers of heat plastified non-expandable and heat plastified expandable thermoplastic resinous material, expressing the composite stream from the configuration and causing the expandable material to expand.

The present invention is beneficially employed to prepare an article which comprises an expanded cellular thermoplastic resinous body comprising at least five layers, and beneficially from about 10 to 1000 layers, wherein said layers are bonded to each other, and alternate layers comprise solid thermoplastic resinous film having a thickness of from about 10 microns to about 10 mils, the remaining layers comprised of an expanded cellular thermoplastic resinous foam, the layers being in generally parallel relationship to each other.

The method of the invention is particularly adapted to employ apparatus which comprises in cooperative combination a housing defining at least one cavity therein and adapted to receive at least a first and sceond heat plastified thermoplastic stream, distribute the streams into a plurality of smaller streams, the smaller streams being in generally alternate arrangement with smaller streams from the first stream, being in alternating arrangement with the smaller streams from the second stream, a housing defining a passageway, the passageway having an entrance and an exit, the entrance having a first axis and a second axis, the exit having a first axis and a second axis, the first axes of the entrance and the exit being co-planar and the second axes of the entrance and the exit being co-planar, the first and second axes of the entrance and the exit being disposed generally normal to each other, the first axis of the entrance being the major axis and the second axis the minor axis, the first axis of the exit being the minor axis and the second axis of the exit being the major axis, the passageway being so constructed and arranged so as to permit streamline flow of a fluid therein and the length of the first axis of the major entrance being substantially greater than that of the first axis of the exit.

These features and other benefits and advantages in accordance with the method of the present invention will become more apparent from the following specification when taken in connection with the drawing wherein:

FIG. 3 shows a view of a distribution block employed in the manifold.

Figure 1:
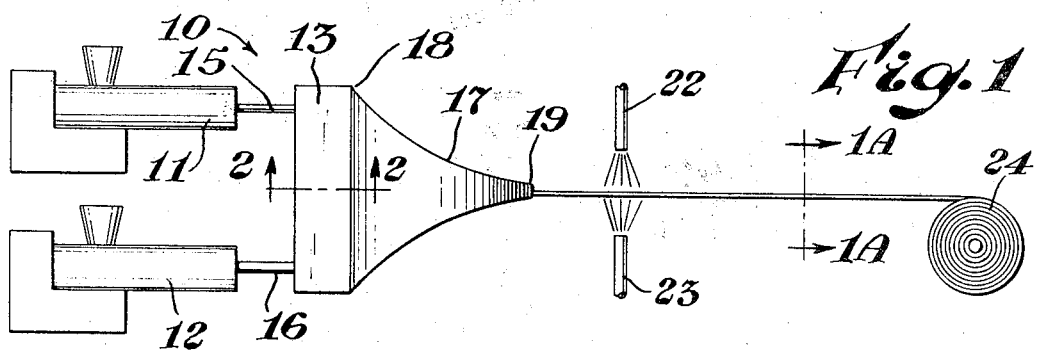
FIG. 1 is a schematic representation of a simplified apparatus employed in accordance with the method of the invention showing an enlarged section of the product thereof.

In FIG. 1 there is illustrated an apparatus employed in accordance with the method of the invention generally designated by the reference numeral 10. The apparatus 10 comprises in cooperative combination a first extruder 11, a second extruder 12, a distribution manifold 13 in full communication with the extruder 11 by means of a conduit 15 and in communication with the extruder 12 by means of a conduit 16. A transition piece 17 having an inlet or first opening 18 and a second or outlet opening 19 is in communication with the discharge of the manifold 13. A laminated film 20 issues from the discharge opening 19. Adjacent the opening 19 are cooling means 23 which reduce the temperature of the laminate film or sheet 20 to a temperature below the thermoplastic temperature thereof. The film or sheet 20 is wound onto a takeup means or roll 24. An enlarged portion 20a of the film 20 is shown depicting a plurality of lamina 25 and 26 of material from the extruders 11 and 12, respectively.

Figure 1B:
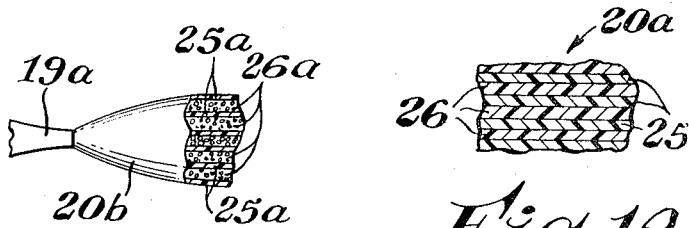
FIG. 1B is a schematic representation of an alternate embodiment of the invention.
Figure 1A:
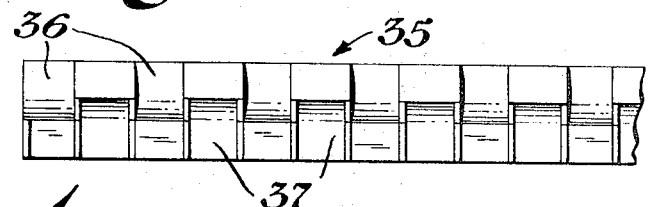
FIG. 1A is a schematic enlarged sectional view of the sheet 20 taken along the line 1A—1A of FIG. 1.

In FIG. 1A there is depicted a schematic cross-sectional representation of the sheet 20 taken along the line 1A—1A of FIG. 1 showing a plurality of parallel first lamina or layers 25 interdigitated with a plurailty of layers 26.

In FIG. 1B there is schematically depicted an alternate embodiment of the apparatus employed in the method of the invention. A discharge opening 19a of a die is shown extruding a partially cutaway composite sheet 20b having layers 25a of an unfoamed material and layers 26a of a foamed material. The unfoamed layers 25a are interdigitated with the foamed layers 26a.

Figure 2:
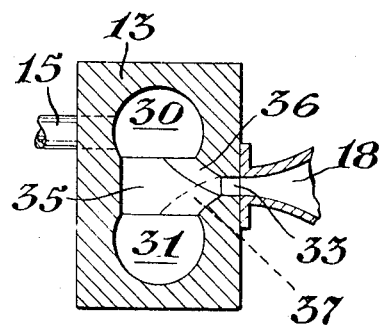
FIG. 2 is a sectional view through a distribution manifold of the apparatus of FIG. 1.

In FIG. 2 there is illustrated a sectional view of the manifold 13. The manifold 13 comprises a first major passageway 30 in communication with the conduit 15, a second major passageway 31 in communication with the conduit 16 (not shown), an extrusion slot or orifice 33 and a distribution block 35. The distribution block 35 defines a plurality of passageways 36 and a plurality of passageways 37. The passageways 36 provide communication between the first major passageway 30 and the extrusion orifice 33. The passageways 37 provide communication between the second major passageway 31 and the extrusion orifice 33. The passageways 36 and 37 are so constructed and arranged that they alternate in the distribution block and provide interdigitated streams of the material flowing from the first and second major passageways 31 to the extrusion orifices 33.

In FIG. 3 a front partial view of the distribution block 35 is shown illustrating the relationship between the passageways or channels 36 and 37 illustrating the interdigitated discharge of the thermoplastic materials.

Figure 4:
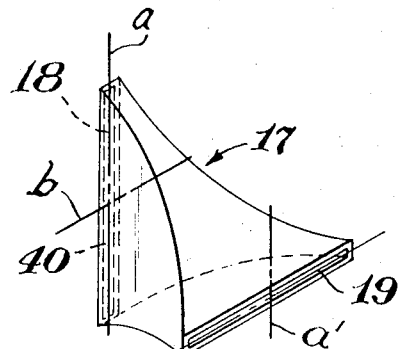
FIG. 4 is a schematic isometric representation of a transition piece as utilzde in the apparatus of FIG. 1.

In FIG. 4 there is illustrated an isometric representation of a transition piece 17 having an inlet opening 18 and an outlet opening 19. A passageway 40 provides full communication between the inlet and outlet opening and permits streamline flow of a liquid from the opening 18 to the opening 19 without rotation of the flow lamina. The inlet opening 18 has a first or major axis $a$ and a second or minor axis $b$. The outlet opening 19 has a first axis $a'$ and a second axis $b'$. The axes $a$ and $a'$ are generally co-planar and the axes $b$ and $b'$ are generally co-planar. The transition piece of FIG. 4 is an exponential transition piece of constant cross-sectional area wherein its length is arbitrarily selected and the central portion has a square cross-section having a length $l$, $b$ and $h$ are the desired width and height, respectively, of one of the openings. The equation of the outline of the transition section such as is seen in FIG. 1 if a $z$ axis is assumed to run vertically is:

$$z = \sqrt{\frac{bh}{2}} \left(\frac{h}{b}\right)^{x/l}$$

The equation for a line drawn centrally through the conduit and corresponding to the outline in a plane 90° to the observed plane of FIG. 1 is:

$$y = \sqrt{\frac{bh}{2}} \left(\frac{h}{b}\right)^{x/l}$$

Figure 5:
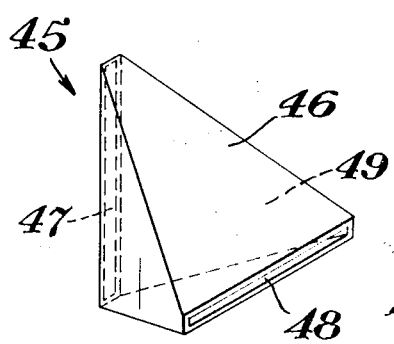
FIG. 5 is an alternate configuration of a transition piece.

The exponential transition section is particularly advantageous and beneficial if uniform flow rate within the transition piece is to be maintained. For many purposes, a transition piece such as is illustrated in FIG. 5 is adequate. A transition piece of FIG. 5 generally designated by the reference numeral 45 comprises a housing 46 defining an inlet passage 47, an outlet passage 48 and an internal interconnecting channel 49 so constructed and arranged so as to permit substantially streamlined flow of material entering the passageway 47 and being discharged from the opening 48.

Figure 6:
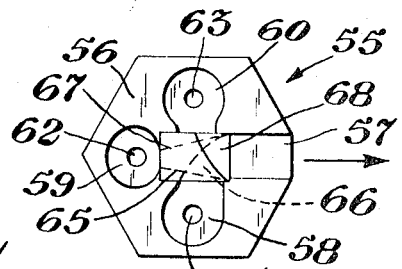
FIG. 6 is an alternate embodiment of a manifold.

In FIG. 6 there is illustrated an alternate configuration of a manifold generally designated by the reference numeral 55. The manifold 55 comprises a housing or body 56 having defined therein an extrusion orifice 57, first, second and third major passageways 58, 59 and 60, respectively, which are in communication with thermoplastic material supply conduits 61, 62 and 63, respectively. A distribution block 65 is disposed within the body 56 and defines a plurality of passageways 66 providing communication between the first major passageway 58 and the extrusion aperture 57, a plurality of passageways 67 providing communication between the major passageway 59 and the extrusion opening 57, a plurality of passageways 68 providing communication between the third major passageway 60 and the extrusion orifice 57. The passageways 66, 67 and 68 are alternately arranged in the distribution block 65.

Figure 7:
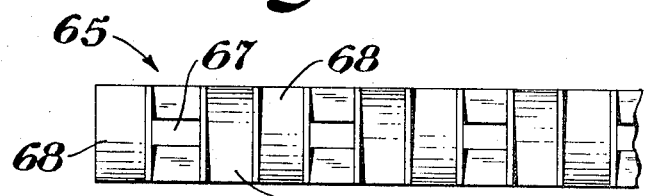
FIG. 7 is a view of a portion of a feed port block for use in the manifold of FIG. 6.

In FIG. 7 a front view of a portion of the distribution block 65 is shown depicting the relationship between the passageways 66, 67 and 68. Each of the passageways terminate in an opening substantially commensurate with the width of the extrusion passage 57. The embodiment of FIG. 6 is particularly advantageous when it is desired to prepare a laminate having three components and a plurality of layers.

In operation of the apparatus in accordance with the method of the invention, thermoplastic resinous material in a heat plastified condition is extruded from the extruders 11 and 12, passed into the manifold 13 to the passageways 30 and 31, respectively. The heat plastified material from the passageway 30 flows to the extrusion orifice 33 by way of the passageways 36. The material from the extruder 12 flows into the passageway 31 and is discharged into the orifice 33 in interdigitating relationship with the material from the extruder 11. Thus, a striped sheet or stream is formed wherein the diverse materials extend from one major surface to the opposite major surface. On passing into the transition section, the extruded sheet in effect is squeezed or reduced (in width) and expanded in a direction corresponding to its thickness until, on emerging from the outlet, the portion of the sheet originally representing the edge is now a major surface or the width and that which had heretofore been the thickness of the sheet is now the width. As the transition piece permits linear or streamline flow, the various components are re-positioned in such a manner that a number of thin layers of material in the form of a composite sheet are obtained without the necessity of employing a plurality of slot dies. The relative thickness of the various layers is readily controlled by varying the quantity of material provided to the manifold by the extruders. Thus, it is possible to have the various materials present in the desired proportion. Due to the relatively large size of the various feed ports defined in the distribution block, control of the thickness of the various layers is readily accomplished without the necessity of maintaining the extremely high dimensional tolerances that are necessary when conventional film and sheeting dies are utilized to prepare laminates. The embodiment of FIGS. 6 and 7 are readily utilized by employing the required number of streams of thermoplastic resinous material to provide the desired laminate. The foamed laminate of FIG. 1B is readily prepared by employing a foamable or expandable composition as feed to the extruder 11 or 12 as desired.

Such laminated foam structures may be prepared in the form of a tube by employing a plurality of concentric extrusion orifices within a die to provide the desired number of layers, or alternately by employing apparatus such as is disclosed in United States Letters Patent 3,131,910, which describes a mixing apparatus having a number of layers spirally disposed within a stream. A similar device is also illustrated in United States Letters Patent 3,127,152. Another apparatus which is useful to generate layers is shown in United States Letters Patent 3,176,965. A relatively thorough discussion and theoretical analysis of mixers utilizing rotation of a conduit relative to a stream flowing therethrough and of fluids in an annular channel are set forth in the American Society of Mechanical Engineers, publication No. 62–WA–336, "Continuous Mixing of Very Viscous Fluids in an Annular Channel," by W. J. Schrenk, K. J. Cleereman and T. Alfrey, Jr.; and publication No. 63–WA–303, "Mixing of Viscous Fluids Flowing Through a Rotating Tube," by W. J. Schrenk, D. S. Chisholm and T. Alfrey, Jr. The methods and devices of the foregoing references are all directed toward the preparation of homogeneous mixtures by providing a plurality of layers and decreasing the thickness of the layers to the vanishing point.

In the practice of the present invention, such devices are used to generate layers of a desired and pre-determined thickness and not to produce a homogeneous or a substantially homogeneous mixture. For example, the flow diverters of United States Letters Patents 3,051,452 and 3,051,453 are readily employed in sufficient numbers to produce the desired number of layers, whereas the rotating mixers described in United States Letters Patents 3,127,152 and 3,131,910 and the American Society of Mechanical Engineers Publications are rotated only at a sufficient rate to generate the desired number of layers. If such mechanical working sections are employed to produce a homogeneous mixture of the diverse streams, the benefits and advantages of the present invention are entirely lost. Such mixers, when operated at less than optimum mixing speeds, produce a layered stream which is then fed to an extrusion die of the desired configuration, such as circular, annular or flat sheet. The layers may be disposed in a helical pattern if a tubing die is employed, or in a flattened helix if a sheeting die is employed.

No particular difficulties are encountered in preparing such laminates. The extrusion conditions employed are substantially those which may be employed for the material alone which forms the outer surface of the sheet. Thus, the temperature of the transition section or die 17 should be about the temperature required for the extrusion of the material forming the outermost layer of the laminate. For example, if a multilayer laminate having the construction ABABAB . . . ABA is being prepared, wherein A and B represent different polymeric materials, the die temperature usually should be that required for the material A. As the heat transfer between viscous liquids such as heat plastified synthetic thermoplastic resinous materials is relatively poor, great latitude is obtained in the extrusion conditions for the material B. Further, because of the presence of a non-expanded material, the foam layers tend to expand in the direction of the thickness rather than isometrically. Generally, for many structural applications it is desirable to employ a relatively rigid foam such as foamed polystyrene and foams of like materals which have a relatively low elongation before break; that is, below about 10 percent, and a relatively extensible material as the solid lamina, such as polyethylene having an elongation well over 100 percent. Such a laminate provides desirable physical properties of both the foam which contributes rigidity and of the softer solid layered material which contributes high impact resistance. Alternately, oftentimes it is desired to have a foam sheet having somewhat resilient properties in the transverse direction and a relatively rigid skin such as a tube obtained, for example by employing a laminate having a plurality of layers of foamed polyethylene and a plurality of unexpanded layers of a more rigid material such as polyvinylchloride, polymethyl methacrylate, polystyrene and the like. In cases where a rigid foam is employed; that is, a foam from a polymer having a relatively low elongation before rupture, the use of a more extensible material contributes greatly to the shear strength which is particularly valuable where such elements are employed as load bearing members. Foam-containing laminates in accordance with the present invention generally are most advantageous when the unexpanded layers are relatively thin; that is, below about 2–3 mils, and as low as about 0.25 micron. As the thinner films are employed, the degree of reinforcement appears to be substantially greater with a subsequent improvement in the resultant physical properties.

Employing apparatus generally similar to the apparatus 10 of FIG. 1, equal quantities of polystyrene and polymethyl methacrylate are extruded at a rate of about 15 pounds per hour into a sheet about 4 inches in width and about 1/8 inch in thickness. The sheet consists of 125 layers alternately of polystyrene and polymethyl methacrylate. On microscopic examination, the layers are determined to be substantially parallel to the surfaces of the sheet and of uniform thickness. The resultant sheet is more flexible and has higher impact resistance than a like sheet of polystyrene or polymethyl methacrylate.

The foregoing example is repeated employing polystyrene in combination with a green tinted nylon. Similar results are obtained. Beneficial laminates are also prepared in accordance with the invention employing polypropylene-polyvinylchloride; polypropylene-polystyrene; ethyl cellulose-polystyrene; polyethylene-polystyrene; polypropylene-polyethylene; polyvinylchloride-saran (copolymer of vinyl chloride and vinylidene chloride), etc. As is evident, the relative thicknesses of the like material are proportional to the amount of material issuing from the appropriate passageway or feed port in the die. Thus, by varying the dimensions of the feed ports, heavier or thicker layers may be employed at desired locations within the film.

In a manner similar to the foregoing illustration, a 125 layer composite is prepared from polyethylene and expandable polystyrene garnules. The feed block corresponding to the block 35 of FIGS. 2 and 3 is so constructed and arranged as to provide a total of 125 streams, 63 of the streams coming from an extruder supplying 10 parts by weight per hour of a polyethylene having a temperature of about 330° F. and the remaining 62 streams being provided by an extruder forwarding 90 parts by weight per hour of a granular polystyrene containing about 6 weight percent pentane. The resultant foam laminate has outer surfaces of polyethylene, 61 inner layers of polyethylene and 62 layers of expanded polystyrene. On cooling of the extruded foam to room temperature, it is found to be extremely tough, of high impact resistance, excellent puncture resistance; on bending it is very difficult to break and does not exhibit the rapid crack propagation shown by polystyrene foam of the same dimension; shows high resistance to shear failure in the plane of a sheet and is resistant to splitting, crumbling and exhibits excellent toughness.

When the foregoing procedure is repeated employing polyvinylchloride in place of polyethylene, a generally similar tough laminated sheet is produced which is fire retardant to a degree substantially greater than one would normally expect from thermoplastic resinous compositions of similar chlorine content. Thus, fire retardant or resistant foamed laminates may be readily prepared employing materials such as polyvinylchloride and vinylidene chloride copolymers.

In a manner similar to the foregoing examples, other composite sheets are readily prepared employing expandable polystyrene, expandable polyethylene, expandable polyvinylchloride, expandable polymethyl methacrylate and the like with expanded polyethylene, expanded polystyrene and the like.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of preparing a sheet of thermoplastic resinous materials by extruding in an extrusion apparatus wherein the materials are arranged as a plurality of lamina having major surfaces generally parallel to the major surfaces of the resultant sheet, the steps of the method comprising
    (a) providing by extruding in an extrusion apparatus a plurality of closely adjacent flowing streams of diverse thermoplastic materials in a heat plastified condition in contiguous relationship to each other, each stream having generally planar surfaces which are generally parallel,
    (b) altering the cross-sectional configuration of the plurality of flowing streams by reducing the dimension of the stream in a direction generally perpendicular to interfaces between the individual streams, and
    (c) increasing the dimension of the stream in a direction transverse to the direction of flow and generally parallel to the interface of the streams to form a sheet-like configuration having a plurality of layers wherein the layer interfaces are in generally parallel relationship to each other and to major surfaces of the sheet-like configuration.

2. The method of claim 1 wherein at least three diverse thermoplastic resinous materials are employed.

3. The method of claim 1 wherein adjacent streams are of diverse thermoplastic resinous materials.

4. The method of claim 1 wherein the reducing and increasing of the dimensions of the stream is performed while keeping the cross-section of the stream of generally constant area.

5. The method of claim 1 wherein the composite stream comprising a plurality of lamina is subsequently cooled below the thermoplastic temperature of the components thereof.

6. The method of claim 1 including the step of providing the streams by means of an extruder.

7. The method of claim 1 wherein the plurality of closely adjacent flowing streams are provided by at least a first extrusion means and a second extrusion means, each extrusion means providing a heat plastified stream, forming each of the streams into first stream portions and second stream portions, interdigitating the stream portions to provide a plurality of closely adjacent flowing streams of diverse thermoplastic materials.

8. The method of claim 1 wherein the streams in contiguous relationship to each other flow in a generally streamline manner.

9. A method for preparing a sheet of thermoplastic resinous materials wherein the materials are arranged as a plurality of laminae, the sheet and the laminae having major surfaces which are generally parallel to the major surface of the resultant sheet, the steps of the method comprising
    extruding at least a first heat plastified synthetic resinous material and a second heat plastified synthetic resinous material to provide first and second heat plastified resinous streams, each stream being of diverse material,
    subdividing the first and second streams into first and second substreams,
    interdigitating the first and second substreams to form a stream having an elongate cross-sectional configuration, the configuration having a first side, a second side, a first edge and a second edge, the substreams having generally planar interfaces and the substreams extending from the first side to the second side of the cross-sectional configuration,
    deforming the stream by forcing the edge portions into generally adjacent relationship and the side portions into remote relationship, thereby forming a stream having a generally elongate cross-sectional configuration having sides corresponding to the edges of the interdigitated substreams and edges corresponding to the sides of the interdigitated substreams, subsequently extruding, and
    cooling the deformed stream to form a laminate sheet of synthetic resinous thermoplastic materials having major surfaces generally parallel to the major surfaces of the extruded stream.

10. The method of claim 1 wherein one of the diverse streams is an expandable thermoplastic resinous material.

11. The method of claim 10 including the step of cooling the composite material below the thermoplastic temperature.

12. The method of claim 10 wherein the non-expandable material is present in layers of from about 0.25 micron in thickness to about 3 mils in thickness.

13. The method of claim 10 including the step of positioning a layer of non-expanded material on each of the major surfaces of the extrude.

References Cited

UNITED STATES PATENTS

| | | | |
|---|---|---|---|
| 2,696,640 | 12/1954 | Wienand | 18—12 |
| 3,189,941 | 6/1965 | Reifenhäuser | 18—13 |
| 3,223,761 | 12/1965 | Raley | 264—95 |
| 3,299,192 | 1/1967 | Lux | 264—53 |

ROBERT F. WHITE, Primary Examiner

J. R. THURLOW, Assistant Examiner

U.S. Cl. X.R.

18—13; 264—171